Patented Nov. 18, 1941

2,262,851

UNITED STATES PATENT OFFICE 2,262,851

MUSHROOM SPAWN

Louis Lescarboura, Oxford, Pa., assignor to Lescarboura Spawn Company, Kelton, Pa., a corporation of Delaware No Drawing. Application February 13, 1940, Serial No. 318,727

10 Claims. (Cl. 47—1.1)

This invention relates to mushroom spawn and the method of making the same, and particularly refers to a mushroom spawn which is strong and vigorous, which is either in a granular or easily separable form, and which can be prepared from an abundant source which is low in cost.

Manure has long been used for the preparation of mushroom spawn and is still the primary substance used for the preparation of substrate. The handling, curing, washing, drying and filling of bottles, however, is relatively awkward and difficult, and to remove manure spawn from bottles it is necessary to break them, involving substantial cost. There is also required a long period of sterilization. To avoid some of these defects, grain has been proposed for the growing of spawn, but the spawns grown on whole grains are of relatively weak nature, since mycelia grow only on the hard surfaces. In contrast, the spawn prepared in accordance with the present invention has a high capacity for growth and provides quick starting of growth when blended in beds.

Briefly stated, the present invention contemplates the use of plant pulps as a material for the growth of the mycelia. Preferably, the pulps are of a vegetable type and most desirably derived from tuberous roots, from which juices have been extracted. In the preferred form of the invention, there are used the pulps consisting of compressed residues of tuberous roots such as beets, carrots and turnips. An analysis of beet pulp is typical, showing, for example, crude protein in excess of 7%, crude fiber less than 22½%, and total insoluble carbohydrates about 48%. Additionally, this pulp contains the necessary mineral constituents for plant growth. It is generally found unsatisfactory to add inorganic chemical substances to promote growth such as nitrogenous compounds, potassium salts, phosphates, etc. While these should all be present, they should be present in a not too soluble form, yet available to mycelia, in the organic material used. The material must be rich in organic nitrogen. All of these desirable properties are found in tuberous roots or the pressed or lixiviated residues of the same.

The pulps used, however, need not necessarily be derived from tuberous roots, and, in fact, apple and citrus pulps, the latter comprising both the skin and interior pulps, may be used. The most vigorous growths, however, are found in the pulps of beets, carrots and turnips. It is also possible to use the pulp obtained by the removal of starch from sweet potato tubers. After the starch is removed, the pulp is rich in protein and mineral constituents desirable for the growth of the mycelia.

The invention will be best understood by reference to the formation of a substrate using dried beet pulp. For example, five pounds of the dried beet pulp are mixed with the amount of water which will be absorbed, approximately, for example, three times the weight of the pulp. To this are added five pounds of humus or common loam. It is preferable to adjust the alkalinity to secure a pH value of between 7 and 8. While it is necessary to take each pulp separately and determine about how much alkaline substance must be added, it is generally found that about ¼ pound of hydrated lime may be added to a mixture such as that just referred to and 1 pound of precipitated chalk. Under these conditions, after standing several days the desired pH value is secured. The purpose of the addition of calcium carbonate in the form of whiting or precipitated chalk is to maintain the alkalinity despite the development of acidity in the wet organic matter.

The substrate thus prepared is sterilized in the usual fashion and is then carefully seeded with a pure culture of spawn known to be satisfactory. The bottles, stoppered with cotton plugs in the usual fashion, are then set aside for incubation.

Using a mixture such as that described, the mycelium grows quite rapidly throughout the entire substrate. The resulting spawn, when planted in beds, produces rapid growth.

While humus has been referred to as added to the pulp, it is unnecessary to secure a quite vigorous growth. However, I prefer to add the humus, i. e., a well composted soil.

It is also possible to mix the pulp in various proportions with manure and/or humus. The pulp supplies the necessary mineral constituents in a highly satisfactory form, and vigorous growth of the mycelium results.

The invention is capable of considerable variation in its practice. As indicated above, pulps of various sorts are usable, not only the pulps from vegetable tuberous roots, but also those resulting from cider manufacture or the expression of citrus fruit juices. The expression of juice in general removes the substances which are relatively undesirable for the growth of mycelium, though by no means inhibitive thereof. Among such substances may be particularly referred to the soluble carbohydrates such as sugars and starch. (Starch, being removable in some cases by washing or extraction, will be referred to herein as "soluble," though it is not soluble in a strict sense.) The major proportions of these in the raw vegetables or fruits are removed by mere expression, and the ordinary commercial pulps on the market contain them in sufficiently low quantities so that their presence does not create any deleterious effect. It may be remarked that starch is not desirable not so much because of any growth inhibiting action as because of its transformation to a paste during the sterilizing operation.

Alkalinity of the substrate, while not absolutely essential, is desirable, and to accomplish this end, lime or other alkali may be used to produce the desired alkalinity. To secure complete neutralization and an ultimate slightly alkaline reaction, it is desirable to introduce the hydrated lime dissolved or dispersed in water to form a thin milk. Quick lime, for example, may be slaked in the water which is to be taken up by the pulp and the humus, if the latter is present. In this fashion, a most intimate admixture of the alkalizing material with the pulp is secured. So far as the neutralization is concerned, it is quite satisfactory to use the alkali hydroxides instead of lye, though preferably lime is used since the presence of calcium for adsorption by the mycelium is desirable in any event.

For domestic use, it is desirable to have the substrate during the growth of mycelium in a light condition which is secured automatically by the use of the pulp if it is not compressed. In such case, there is a very large surface offered to the growth relative to the weight of the substrate, and in a bottle of standard size there is apparently about four times as much mycelium available for future mushroom growth in this spawn as compared with that made from rye. Thus its efficiency is greatly increased.

In cases when distance shipment, for example foreign shipment, is to take place, it is desirable to pack the substrate quite solidly to lessen the bulk for a given weight. In such case the growth takes place quite thoroughly throughout the mass, but at a somewhat slower rate. The resulting product, however, is very easily broken up in the bottle and without breakage of the glass when it is desired to plant it.

It will be evident from the above that numerous variations may be made in carrying out the invention without departing from the scope thereof, even to the extent of using relatively small amounts of pulp as constituents of a substrate largely containing the more usually used bases such as manure or grain for the development of the mycelium. When the pulps are mixed with manure, either cow or horse manure may be used.

What I claim and desire to protect by Letters Patent is:

1. Mushroom spawn comprising pulp of a vegetable root, the pulp being substantially free of juice, in a granular condition, and overgrown with mycelium.

2. Mushroom spawn comprising pulp of a plant root, the pulp being substantially free of juice, in a granular condition, and overgrown with mycelium.

3. Mushroom spawn comprising pulp of a plant root, the pulp being substantially free of juice and low in content of soluble carbohydrates, in a granular condition, and overgrown with mycelium.

4. Mushroom spawn comprising pulp of a vegetable root, the pulp being substantially free of juice and low in content of soluble carbohydrates, in a granular condition, and overgrown with mycelium.

5. Mushroom spawn comprising alkaline pulp of a plant root, the pulp being substantially free of juice, in a granular condition, and overgrown with mycelium.

6. Mushroom spawn comprising alkaline pulp of a plant root, the pulp being substantially free of juice and low in content of soluble carbohydrates, in a granular condition, and overgrown with mycelium.

7. Mushroom spawn comprising pulp of a tuberous root, the pulp being substantially free of juice, in a granular condition, and overgrown with mycelium.

8. Mushroom spawn comprising alkaline pulp of a tuberous root, the pulp being substantially free of juice, in a granular condition, and overgrown with mycelium.

9. Mushroom spawn comprising alkaline pulp of a tuberous root, the pulp being substantially free of juice and low in content of soluble carbohydrates, in a granular condition, and overgrown with mycelium.

10. Mushroom spawn comprising alkaline pulp of a plant root and an alkaline carbonate, the pulp being substantially free of juice, and the mixture being in a granular condition and overgrown with mycelium.

LOUIS LESCARBOURA.